United States Patent
Stokes et al.

(10) Patent No.: US 9,052,864 B1
(45) Date of Patent: Jun. 9, 2015

(54) METHOD AND APPARATUS FOR PROCESSING A PAGE DESCRIPTION LANGUAGE DOCUMENT

(71) Applicant: MARVELL INTERNATIONAL LTD., Hamilton (BM)

(72) Inventors: DeVerl Stokes, Eagle, ID (US); Lyman Leonard Hall, Nampa, ID (US); Philip McDonnell, Coto de Caza, CA (US); Burt Poppenga, Eagle, ID (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

(21) Appl. No.: 14/044,921

(22) Filed: Oct. 3, 2013

Related U.S. Application Data

(60) Provisional application No. 61/710,298, filed on Oct. 5, 2012.

(51) Int. Cl.
*G06F 3/12* (2006.01)
*H04N 1/387* (2006.01)
*G06K 9/00* (2006.01)
*G06K 9/52* (2006.01)
*G06F 17/24* (2006.01)

(52) U.S. Cl.
CPC ............ *G06F 3/1298* (2013.01); *G06F 3/1206* (2013.01); *G06K 9/00577* (2013.01); *G06K 9/52* (2013.01); *H04N 1/3871* (2013.01); *G06F 17/24* (2013.01)

(58) Field of Classification Search
None
See application file for complete search history.

(56) References Cited

U.S. PATENT DOCUMENTS

| | | | |
|---|---|---|---|
| 2008/0282065 A1* | 11/2008 | Imamichi | 712/208 |
| 2008/0320385 A1* | 12/2008 | Freiman et al. | 715/255 |
| 2010/0085590 A1* | 4/2010 | Williams | 358/1.13 |
| 2011/0157627 A1* | 6/2011 | Ishimoto | 358/1.15 |
| 2012/0212779 A1* | 8/2012 | Araki | 358/1.15 |
| 2012/0250056 A1* | 10/2012 | Takeishi | 358/1.13 |

\* cited by examiner

*Primary Examiner* — Miya J Cato

(57) ABSTRACT

Systems, methods, and other embodiments associated with encoding and processing page description language (PDL) documents using a light-weight data interchange format are described. According to one embodiment, an apparatus includes a communication logic configured to receive a request for a page description language (PDL) document. The PDL document is encoded in accordance with a lightweight data interchange format that includes (i) content of the page, and (ii) an arrangement of the content within the page. The apparatus includes a processing logic configured to retrieve the PDL document from a data store and to interpret the PDL document to generate a rasterized document that defines a layout of the page to be printed. The layout of the page as defined by the rasterized document is consistent with the arrangement of the content within the page as specified by the PDL document encoded with the lightweight data interchange format.

20 Claims, 3 Drawing Sheets

METHOD AND APPARATUS FOR PROCESSING A PAGE DESCRIPTION LANGUAGE DOCUMENT

CROSS REFERENCE TO RELATED APPLICATIONS

This patent disclosure claims the benefit of U.S. Provisional Application No. 61/710,298 filed on Oct. 5, 2012, which is incorporated herein by reference.

BACKGROUND

Imaging devices, such as printers, generally receive documents in an initial format and process the documents into a different format so hardware elements within the printer can transfer the documents to a medium, e.g., paper. However, the initial format of the documents is, for example, a page description language (PDL) such as PCL or PostScript. These initial formats are complex and difficult to modify or manually author. That is, a document that is encoded in a PDL format is encoded in a way that is difficult to read and/or to augment without considerable effort on the part of a user. Accordingly, generating documents in a PDL format generally occurs by first creating the documents using a high level language that is then processed into a PDL format. Consequently, generating documents in a PDL format is complex and time consuming.

SUMMARY

In general, in one aspect this specification discloses a method. The method includes receiving, in a printer, a request for a page description language (PDL) document. The PDL document describes a page of content to be printed by the printer. The method includes retrieving, from a data store of the printer, the PDL document. The PDL document is encoded in accordance with a lightweight data interchange format that includes (i) the content of the page, and (ii) an arrangement of the content within the page. The method includes interpreting, in the printer, the PDL document to generate a rasterized document that defines a layout of the page to be printed. The layout of the page as defined by the rasterized document is consistent with the arrangement of the content within the page as specified by the PDL document encoded with the lightweight data interchange format.

In general, in another aspect, this specification discloses an apparatus. The apparatus includes a communication logic configured to receive a request for a page description language (PDL) document. The PDL document describes a page of data to be printed. The PDL document is encoded in accordance with a lightweight data interchange format that includes (i) content of the page, and (ii) an arrangement of the content within the page. The apparatus includes a processing logic configured to retrieve the PDL document from a data store and to interpret the PDL document to generate a rasterized document that defines a layout of the page to be printed. The layout of the page as defined by the rasterized document is consistent with the arrangement of the content within the page as specified by the PDL document encoded with the lightweight data interchange format.

In general, in another aspect, this specification discloses a method. The method includes encoding a page of data into a page description language (PDL) document by translating the page of data into a lightweight data-interchange format to form the PDL document. The PDL document in the lightweight data interchange format includes (i) content of the page, and (ii) an arrangement of the content within the page. The method includes interpreting, in a printer, the PDL document to generate a rasterized document for printing the page of data.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with encoding page description language (PDL) documents using a light-weight data interchange format and processing the encoded PDL documents. Consider that when a user creates an electronic document an application will generally generate the document using a proprietary format or other format that is specific to the application. In general, an imaging device (e.g., a printer) is not configured to interpret and print documents directly from a format used by the application. That is, the application creates documents in a format that is not understood (or interpretable) by the printer. Accordingly, a document is generally interpreted through one or more intermediate processes until the document is in a format that can be understood by the printer.

However, formats understood by the printer are, for example, difficult to decipher by a user. Accordingly, different documents (e.g., test and calibration documents) that are specific to the printer can be difficult to manually author and to read because of the complex nature of the printer format. Therefore, in one embodiment, page description language (PDL) documents are encoded using a light-weight data interchange format (e.g., JavaScript Object Notation (JSON)). Using the light-weight data interchange format to encode the PDL documents improves the ability to author and use the PDL documents. In this way, the PDL documents can be generated directly without multiple tiers of processing to translate documents from an application into PDL documents.

Figure 1:
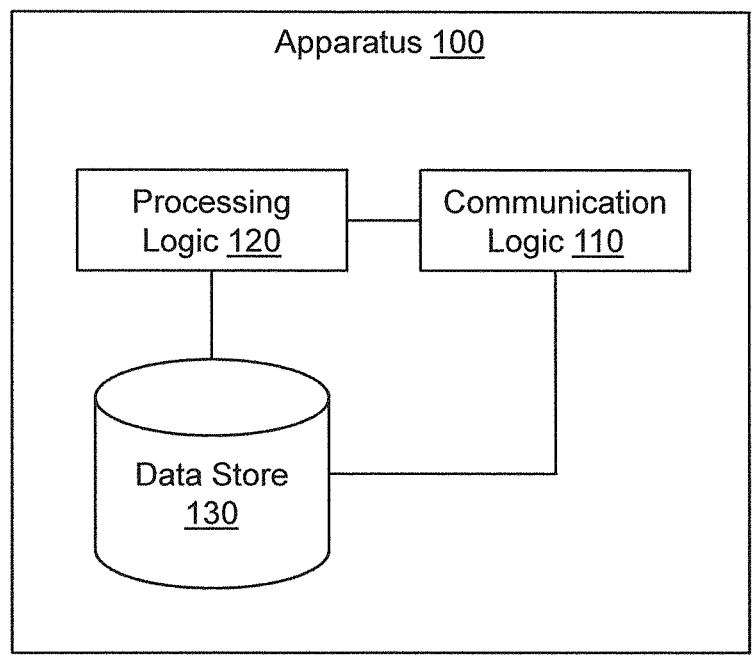
FIG. 1 illustrates one embodiment of an apparatus associated with processing page description language (PDL) documents encoded with a light-weight data interchange format.

With reference to FIG. 1, one embodiment of an apparatus 100 is shown that is associated with encoding PDL documents using a light-weight data interchange format and subsequently processing the PDL documents. In one embodiment, the apparatus 100 includes communication logic 110, a processing logic 120, and a data store 130. The apparatus 100 is, for example, an integrated circuit or other device that is part of an imaging device such as a printer, multi-function printer (MFP), a fax, a copier, and so on. In general, the apparatus 100 is configured to, for example, process documents for printing and may include a processor, memory, a communication interface, an image forming system (e.g., ink based, laser based, etc.), paper handling mechanisms, image scanner, and/or other components of an imaging device. The documents are, for example, word processing documents, presentation documents, spreadsheets, printer calibration documents, printer test documents, graphics, pictures, printer utility pages, and so on.

Accordingly, the communication logic 110 receives various requests to print documents. In one embodiment, the requests are from a remote device (not shown) and are requests to print one or more documents included within the request. For example, consider that a user of a computer or other device that is in communication with the apparatus 100 desires to print a document from a word processing application or other application. In general, the user initiates the printing process by selecting to print the document from within the application. To print the document, the computer first translates the document into an intermediate format using, for example, a graphics device interface (GDI) in the computer. Once the document has been converted to the intermediate format, still further processing is performed by the computer using, for example, a printer driver and/or additional logic to encode the document into a format that is understood by the printer.

In one embodiment, the format that is understood (or interpretable) by the printer is, for example, a page description language (PDL). A page description language is a language that is used to describe the appearance of a printed page in a higher level than an actual output bitmap. In general, a PDL is a language format that describes a document in textual or binary streams. However, in one embodiment, the computer uses a lightweight data interchange format as the PDL when translating the document. The lightweight data interchange format describes an appearance of the document, which includes content of the document (e.g., graphics, text, and so on) and an arrangement of the content within the document. In general, the lightweight data interchange format is a text-based cross platform compatible format that is interpretable by many different devices. Additionally, the lightweight data interchange format permits a user to understand both (i) the content of the page to be printed and (ii) the arrangement of the content within the page prior to the page being printed by the printer. In this way, documents encoded with the lightweight data interchange format can be reviewed, edited, or even generated by a user.

For example, JavaScript Object Notation (JSON) is one example of a lightweight data interchange format that may be used by the computer as a format for the PDL. Accordingly, PDL documents encoded with JSON may be referred to as JSON PDL (jPDL) documents. JSON is a text-based format for representing data structures and associative arrays. In general, JSON is a cross-platform format that is programming language independent. That is, JSON includes syntax and functions that can be interpreted by many different languages and not just, for example, JavaScript. Accordingly, using JSON to encode PDL documents results in PDL documents (i) that have improved readability by a user since JSON is text based, and (ii) that are compatible across different operating systems and types of devices.

While a computer has been discussed as generating the PDL document and providing the PDL document to the apparatus 100, of course, in other embodiments, the PDL document may reside within the apparatus 100 or is generated (i.e., encoded) by the apparatus 100 from a page of data (i.e., a document). For example, in one embodiment, the processing logic 120 is configured to encode the PDL document by translating a page of data into the lightweight data-interchange format (e.g., JSON) to form the PDL document.

Consider that, for example, the apparatus 100 may receive a page of data (e.g., a document that includes one or more pages) from a computer. The page of data is initially encoded, for example, in an intermediate that is not appropriate for rendering. Thus, the apparatus 100 is configured with the processing logic 120 to interpret the page of data and encode the page of data into a PDL document according to the lightweight data-interchange format (e.g., JSON). In this way, the processing logic 120 can subsequently store the encoded PDL document in the data store 130 or proceed by processing the PDL document into a rasterized format for printing. Accordingly, in one embodiment, the apparatus 100 functions to accept documents formatted in a way that is not understood by a printer and translate the documents into a format understood by the printer and for use by the printer.

In another embodiment, the communication logic 110 receives a request for a PDL document from a user. The PDL document is, for example, a calibration page, a test page, a sample page or another utility page that is stored within the data store 130 of the apparatus 100. As discussed previously, the PDL document is encoded according to the lightweight data interchange format (e.g., JSON). Accordingly, the PDL document describes a page of data and is stored within the data store 130 of the apparatus 100. In this way, the apparatus 100 stores a plurality of documents (e.g., pages of data) locally within the data store 130 that are accessible by a user directly from the apparatus 100 and without use of a remote device or separate computer. Accordingly, in one embodiment, the processing logic 120 is configured to retrieve the PDL document from the data store 130 upon receiving the request.

Furthermore, whether the apparatus 100 stores the PDL document and retrieves the PDL document in response to a request, encodes the PDL document upon receiving a document in an intermediate format, or receives the PDL document from another device for processing, the apparatus 100 processes the PDL document that is encoded with the lightweight data interchange format (e.g., JSON) for printing. For example, the processing logic 120 is configured to process PDL documents that are formatted with the lightweight data interchange format into a rasterized document for printing.

That is, subsequent to receiving a request to print the PDL document, the processing logic 120 interprets the PDL document to generate a rasterized document for printing. In general, the processing logic 120 interprets the PDL document using a proto-type scripting language (e.g., JavaScript). For example, consider that the processing logic 120 includes a proto-type scripting language engine (e.g., a JavaScript engine). The proto-type scripting language engine is configured to interpret PDL documents encoded according to the lightweight data interchange format (e.g., JSON) and execute associated functions to generate the rasterized document.

In one embodiment, the processing logic 120 is configured to interpret the PDL document by parsing, validating and rendering the PDL document into the rasterized document. The rasterized document is a bitmap or other document that defines an actual layout of a printed page of data using, for example, an arranged series of pixels. The rasterized document is used by the apparatus 100 to print the page of data.

Accordingly, the processing logic 120 evaluates various statements in the PDL document to generate the rasterized document. The statements may include font selections, drawing objects, coordinates for the drawing objects within the page, or, more generally, statements that define how to draw/render the rasterized document.

A syntax and form of the statements is defined by the lightweight data interchange format (e.g., JSON) that is used to encode the PDL document. For example, a PDL document may be arranged to include sections for document/page metadata, configuration flags, user defined global variables, and an array of drawing objects that define page content. In general, the document/page metadata is data added to a PDL document for the benefit of a document author (e.g., document version), but is not used to define any aspect of the page content. The configuration flags are values that are used while processing the PDL document to control dynamic parts of the PDL document. That is, the configuration flags provide information that is used when evaluating dynamic statements within the PDL document (e.g., location of a reference file). The user defined global variables are key/value pairs that centralize repetitive data such as drawing object coordinates, font settings, and so on that are used throughout the PDL document. The drawing objects are objects that describe page content such as graphics, text, and so on.

Thus, interpreting the PDL document to render the rasterized document includes parsing and validating the statements of the PDL document to render the rasterized document. Additionally, in one embodiment, the processing logic 120 dynamically translates one or more variables in the PDL document to include values for the one or more variables that are based, at least in part, on settings determined in real-time. For example, when the processing logic 120 parses and validates the PDL document, various portions of the PDL document are dynamically evaluated as a function of the encoding of the PDL document to determine localized/dynamic values for the one or more variables on-the-fly.

Settings in the apparatus 100 can include options/variables such as font preferences, language preferences (e.g., English, German, etc.), Internet Protocol address, device name, toner levels, and other preferences/variables that can be incorporated into a generic PDL document (e.g., a printer calibration page) on-the-fly as the generic PDL document is rendered. Consider that the apparatus 100 is configured with the settings upon being initialized. That is, when the apparatus 100 is, for example, initially setup, the apparatus 100 is configured with location specific information such as a language and a device name. Thus, subsequently, when the apparatus 100 receives a request to, for example, print a calibration page, the processing logic 120 dynamically interprets the calibration page by evaluating various dynamic statements in the calibration page and rendering the dynamic statements with information from the settings.

In this way, the PDL document can include replaceable content that is updated/rendered when the PDL document is rendered into a rasterized document. Accordingly, the PDL document can include content that is dynamically modified as the PDL document is rendered for printing. Consider the following generic example statements:

Example 1: $OID {"substitute values"}
Example 2: $localize {string to replace}
Example 3: $eval {"evaluate at runtime"}

Examples 1-3 illustrate statements that are evaluated during processing of the PDL document to determine dynamic values for the statements. As shown above the brackets "{ }" for each statement include placeholder generic text. However, when used in an actual PDL document the brackets include variables and other data that is used to evaluate the statements.

Example 1 is one example of an object identifier statement. The object identifier statement, when implemented in a PDL document, causes a value to be substituted in real-time that correlates with an object identifier name. Example 2 is one example of a localize statement. The localize statement causes strings of text to be replaced with strings from settings of the apparatus 100. Example 3 is one example of an evaluate statement. The evaluate statement can include program code (e.g., JavaScript) that is dynamically evaluated as the PDL document is rendered in order to include dynamic content. The program code in the evaluate statement can include, for example, Boolean operators, numbers, strings, functions, conditional elements, and so on.

Thus, dynamic content of the PDL document may include showing or hiding objects as a function of a condition, replacing localized string content, retrieving values from the data store 130 that are particular to the apparatus 100, factoring out repetitive data into global variables, and so on.

Figure 2:
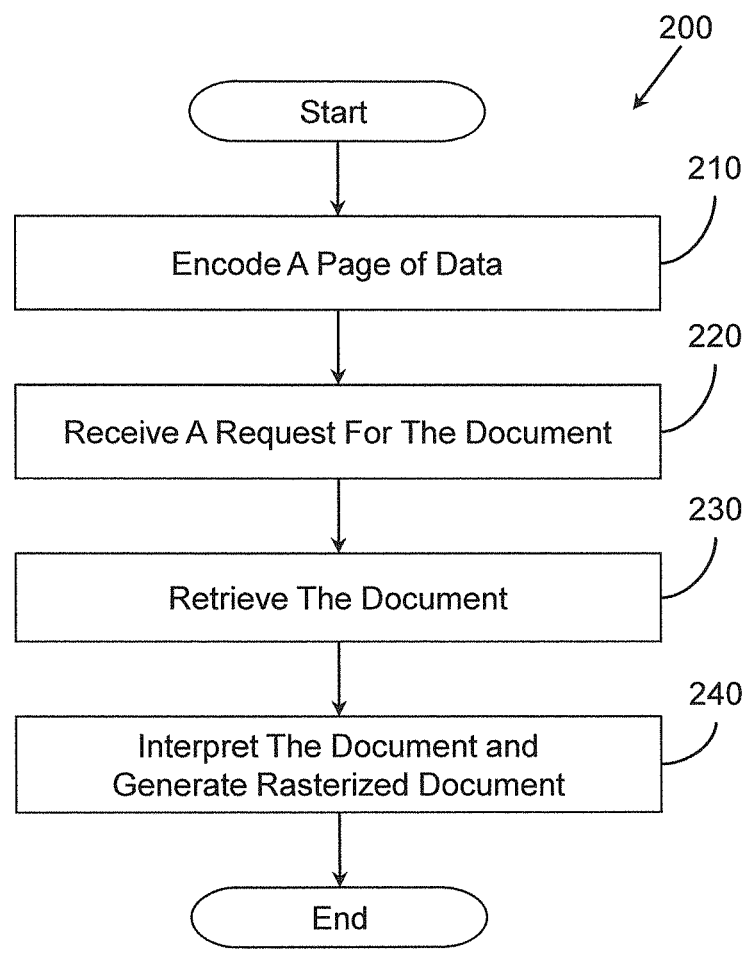
FIG. 2 illustrates one embodiment of a method associated with processing page description language (PDL) documents encoded with a light-weight data interchange format.

Further details of processing page description language (PDL) documents will be discussed in greater detail with reference to FIG. 2. FIG. 2 illustrates one embodiment of a method 200 associated with encoding and processing page description language (PDL) documents. FIG. 2 will be discussed from the perspective of a printer that is configured to process and print documents encoded using a light-weight data interchange format (e.g., JSON).

At 210, a page of data is encoded into a lightweight data-interchange format (e.g., JSON) to form a PDL document. The page of data is, for example, a document (e.g., word processing document) or other data (e.g., picture) that is to be printed. In one embodiment, the printer encodes the page of data. In other embodiments, the PDL document is encoded either manually by a user or by a computer or other device that translates the page of data into the PDL document.

In either case, the PDL document is encoded using the lightweight data-interchange format, which is, for example, JavaScript Object Notation (JSON). In general, the PDL document describes an appearance of the page of data, which includes content of the page and an arrangement of the content on the page. JSON is a text-based encoding format that has improved readability over other PDL document encoding formats (e.g., PCL, Postscript, etc.). In this way, PDL documents can be encoded without requiring intermediate processes and are accessible by users that wish to manually alter the PDL documents.

Continuing with method 200, at 220, the printer receives a request for a document. The request is, for example, a request to print the PDL document. While encoding the document has been discussed as occurring before receiving the request, at 210, in one embodiment block 210 occurs after block 220 and the printer encodes the page of data into the PDL document after receiving the request. For example, while the printer may store the PDL document in a local data store, in other embodiments, the request may include the page of data. Thus, the printer may encode the page of data into the PDL document after receiving the request, at 220.

Accordingly, the request may be either an internal request of the printer or a communication from another device to the printer that includes the page of data. For example, the request may be generated internally by the printer when a user operating a control panel initiates input to the printer. In another embodiment, a process executing in the printer requests that a local PDL document from a data store be printed.

At 230, the PDL document is retrieved from the data store in the printer. For example, the printer may store a plurality of PDL documents in the data store. The plurality of PDL documents stored within the printer may include printer test documents, calibration documents, and so on. In another embodiment, the printer stores incoming documents and documents that have just been received and encoded in a queue or buffer to await printing and which are subsequently retrieved at 230.

At 240, the PDL document is interpreted to generate a rasterized document for printing the page of data described by the PDL document. For example, the printer uses a proto-type scripting language engine (e.g., JavaScript engine) to parse, validate and render the PDL document into a format that is usable by hardware elements in the printer for printing the page of data. Additionally, in one embodiment, the printer dynamically translates one or more variables in the PDL document so that values for the one or more variables are rendered according to settings determined in real-time from the printer.

The settings may include time dependent settings or values that change over time. For example, the settings may include a toner level of a toner cartridge in the printer. Since the toner level is continuously changing as the printer prints more pages, the toner level is determined dynamically as the PDL document is rendered in, order to provide an accurate assessment of the toner level. Other settings may include IP addresses presently assigned to the printer, language settings (e.g., English, French, etc.), font preferences, and so on. Accordingly, encoding the PDL document using the lightweight-data interchange format permits dynamic content to be included within a printed page of data.

Figure 3:
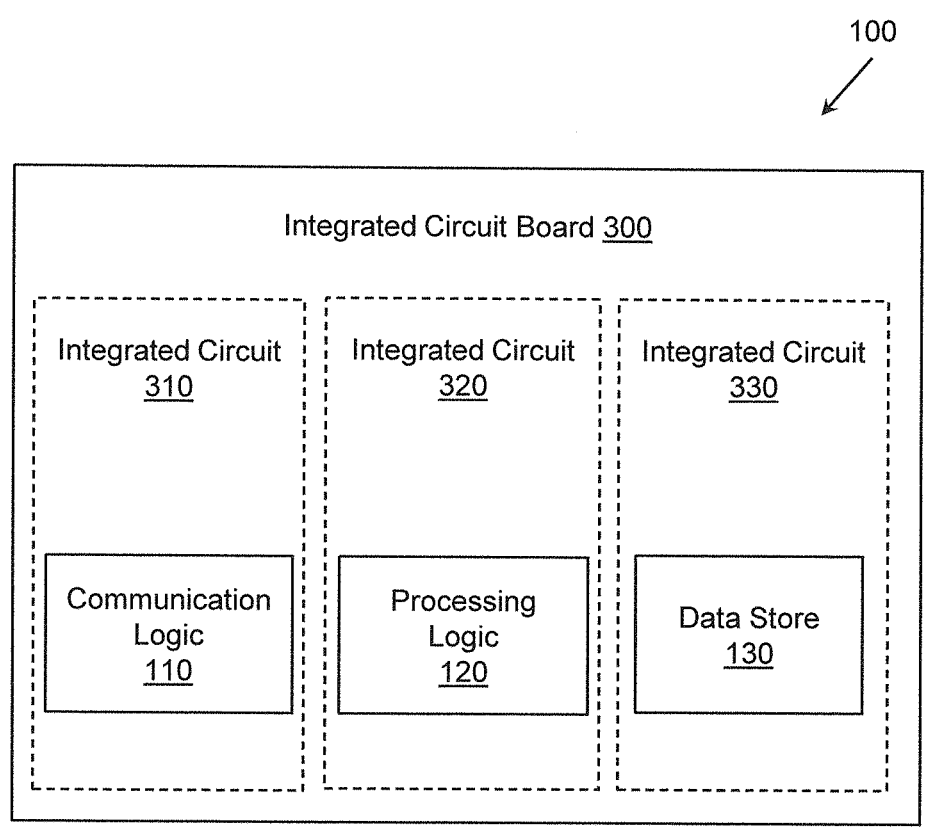
FIG. 3 illustrates one embodiment of an integrated circuit (s) configured with the disclosed systems, methods, and/or equivalents.

FIG. 3 illustrates an additional embodiment of the apparatus 100 from FIG. 1 that is configured with separate integrated circuits and/or chips. In this embodiment, the communication logic 110 from FIG. 1 is embodied as a separate integrated circuit 310. Additionally, the processing logic 120 is embodied on an individual integrated circuit 320. The data store 130 is also embodied on an individual integrated circuit 330. Alternatively, the data store 130 is embodied as a separate storage device or drive (not shown). The circuits are connected via connection paths to communicate signals. While integrated circuits 310, 320, and 330 are illustrated as separate integrated circuits, they may be integrated into a common integrated circuit board 300. Additionally, integrated circuits 310, 320, and 330 may be combined into fewer integrated circuits or divided into more integrated circuits than illustrated. In another embodiment, the communication logic 110, the processing logic 120, and the data store 130 (which are illustrated in integrated circuits 310, 320, and 330, respectively) may be combined into a separate application-specific integrated circuit. In other embodiments, portions of the functionality associated with the communication logic 110 and the processing logic 120 may be embodied as firmware executable by a processor and stored in a non-transitory memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A method, comprising:
    receiving, in a printer, a request for a page description language (PDL) document stored in a data store of the printer, wherein the PDL document describes a page of content to be printed by the printer;
    retrieving, from the data store of the printer, the PDL document, wherein the PDL document is encoded in accordance with a lightweight data interchange format that includes (i) the content of the page, and (ii) an arrangement of the content within the page, wherein the lightweight data-interchange format is JavaScript Object Notation (JSON); and
    interpreting, in the printer, JSON content of the PDL document according to a JSON format to generate a rasterized document that defines a layout of the page to be printed,
    wherein the layout of the page as defined by the rasterized document is consistent with the arrangement of the content within the page as specified by the PDL document encoded with the lightweight data interchange format.

2. The method of claim 1, wherein the request is an internal request of the printer that is generated within the printer in response to an input from a user for the PDL document, wherein the PDL document describes an appearance of the content of the page, and wherein the appearance for the content of the page includes content of the page and an arrangement of the content on the page.

3. The method of claim 1, wherein interpreting the PDL document includes interpreting the document according to a proto-type scripting language.

4. The method of claim 3, wherein the proto-type scripting language is JavaScript.

5. The method of claim 1, wherein the lightweight data interchange format of the PDL document permits the user to understand both (i) the content of the page and (ii) the arrangement of the content within the page prior to the page being printed by the printer.

6. The method of claim 1, wherein interpreting the PDL document includes dynamically translating one or more variables that are formatted according to JSON in the PDL document to include values for the variables that are based, at least in part, on settings determined in real-time from the printer.

7. The method of claim 1, further comprising:
encoding, prior to receiving the request, the PDL document by translating the content of the page into the lightweight data-interchange format to form the PDL document.

8. The method of claim 1, wherein interpreting the PDL document includes parsing, validating and rendering the PDL document into the rasterized document, and wherein validating the PDL document includes identifying whether the PDL document is formatted according to JSON and parsing and rendering content of the PDL document according to JSON when the PDL document is formatted in JSON.

9. An apparatus, comprising:
communication logic configured to receive a request for a page description language (PDL) document stored in a data store of the apparatus, wherein the PDL document describes a page of data to be printed, wherein the PDL document is encoded in accordance with a lightweight data interchange format that includes (i) content of the page, and (ii) an arrangement of the content within the page, wherein the lightweight data-interchange format is JavaScript Object Notation (JSON); and
processing logic configured to retrieve the PDL document from the data store and to interpret JSON content of the PDL document according to a JSON format to generate a rasterized document that defines a layout of the page to be printed, wherein the layout of the page as defined by the rasterized document is consistent with the arrangement of the content within the page as specified by the PDL document encoded with the JSON format.

10. The apparatus of claim 9, wherein the request is an internal request of the apparatus that is generated in response to an input from a user for the PDL document, wherein the PDL document describes an appearance of the page of data, and wherein the appearance for the page of data includes content of the page and an arrangement of the content on the page.

11. The apparatus of claim 9, wherein the processing logic is configured to interpret the PDL document according to a proto-type scripting language.

12. The apparatus of claim 9, wherein the lightweight data interchange format of the PDL document permits the user to understand both (i) the content of the page and (ii) the arrangement of the content within the page prior to the page being printed by the printer.

13. The apparatus of claim 9, wherein the processing logic is configured to interpret the PDL document by dynamically translating one or more variables that are formatted according to JSON in the PDL document to include values for the variables that are based, at least in part, on settings determined in real-time.

14. The apparatus of claim 9, wherein the processing logic is configured to encode the PDL document by translating the page of data into the lightweight data-interchange format to form the PDL document.

15. The apparatus of claim 9, wherein the processing logic is configured to interpret the PDL document by parsing, validating and rendering the PDL document into the rasterized document, and wherein the processing logic is configured to validate the PDL document by identifying whether the PDL document is formatted according to JSON and parsing and rendering content of the PDL document according to JSON when the PDL document is formatted in JSON.

16. The apparatus of claim 9, wherein the apparatus is an imaging device.

17. A method, comprising:
encoding a page of data into a page description language (PDL) document by translating the page of data into a lightweight data-interchange format to form the PDL document, wherein the PDL document in the lightweight data interchange format includes (i) content of the page, and (ii) an arrangement of the content within the page, wherein the lightweight data-interchange format is JavaScript Object Notation (JSON); and
interpreting, in a printer, JSON content of the PDL document according to a JSON format to generate a rasterized document for printing the page of data.

18. The method of claim 17, wherein the PDL document describes an appearance of the page of data, and wherein a layout of the page as defined by the rasterized document is consistent with the arrangement of the JSON content within the page as specified by the PDL document encoded with JSON, and wherein interpreting includes validating the PDL document by identifying whether the PDL document is formatted according to JSON and parsing and rendering content of the PDL document according to JSON when the PDL document is formatted in JSON.

19. The method of claim 17, wherein interpreting the PDL document includes interpreting the document according to a proto-type scripting language, and wherein the lightweight data interchange format of the PDL document permits a user to understand both (i) the content of the page and (ii) the arrangement of the content within the page prior to the page being printed by the printer.

20. The method of claim 17, wherein interpreting the PDL document includes dynamically translating one or more variables in the PDL document to include values for the one or more variables that are based, at least in part, on settings determined in real-time from the printer.

* * * * *